United States Patent [19]

Laucht et al.

[11] Patent Number: 5,011,181

[45] Date of Patent: Apr. 30, 1991

[54] STEERING WHEEL MOUNTED AIR BAG MODULE INCLUDING ELECTROMAGNETICALLY SHIELDED SENSOR

[75] Inventors: Horst Laucht, Bruckmuehl; Richard Baur, Pfaffenhofen; Bernd Werner, Schliersee; Karl E. Nilsson, Ottobrunn; Peter Hora, Schrobenhausen, all of Fed. Rep. of Germany

[73] Assignees: Messerschmitt-Boelkow-Blohm GmbH, Ottobrunn; Bayern-Chemie Gesellschaft fuer Flugchemische Antriebe, Aschau/Inn, both of Fed. Rep. of Germany

[21] Appl. No.: 458,730

[22] PCT Filed: Jun. 16, 1989

[86] PCT No.: PCT/EP89/00680

§ 371 Date: Jan. 31, 1990

§ 102(e) Date: Jan. 31, 1990

[51] Int. Cl.[5] .................... B60R 21/20; B60R 21/32
[52] U.S. Cl. .................... 280/731; 280/735
[58] Field of Search .............. 280/728, 743, 731, 735, 280/734

[56] References Cited

U.S. PATENT DOCUMENTS 4,167,276 9/1979 Bell et al. ..................... 280/731
4,700,973 10/1987 Gademann et al. ............. 280/735

FOREIGN PATENT DOCUMENTS 2711192 9/1978 Fed. Rep. of Germany.
3619937 12/1987 Fed. Rep. of Germany.
212149 9/1988 Japan ........................... 280/735
2019198 10/1979 United Kingdom.

OTHER PUBLICATIONS

Article entitled: "Sources, Cheminements et Impacts des Pertubations Electromagnetiques dans les Dispositifs Electroniques des Systemes de Transports" by M. Heddebaut et al., "Ingenieurs des de L'Augomobile", Sep. 1988, pp. 114–121.

Article entitled: "Der Airbag als Verbesserung des zukünftigen Insassenschutzes" (The Airbag as an Improvement of Future Passenger Protection) by H. Scholz, in ATZ (Automobiltechnische Zeitschrift) 77, (1975)11, pp. 314 to 317; (English Summary Included).

*Primary Examiner*—Charles A. Marmor
*Assistant Examiner*—Karin Tyson
*Attorney, Agent, or Firm*—W. G. Fasse; D. H. Kane, Jr.

[57] ABSTRACT

The invention relates to a safety device for motor vehicles in the form of an impact protection arrangement, wherein the pot-shaped housing of the sensor for the activation of the ignition device of the gas generator, has a form fitting with the flange of the gas generator housing, and is attached to it in such a way that part of the gas generator housing is contained in the sensor housing, thereby forming an air gap which is electromagnetically shielded against interfering influences. An example embodiment is described and shown in the figures of the drawings.

5 Claims, 2 Drawing Sheets

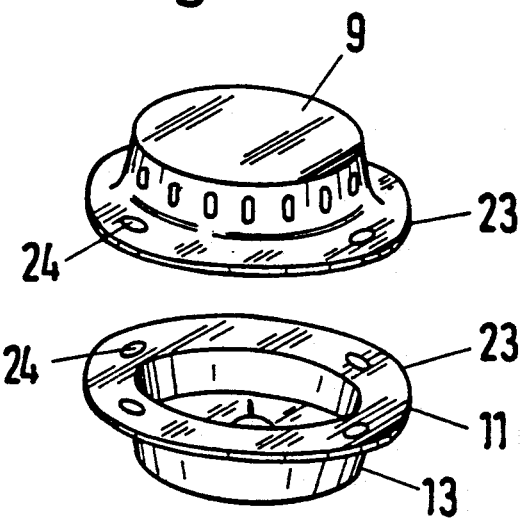
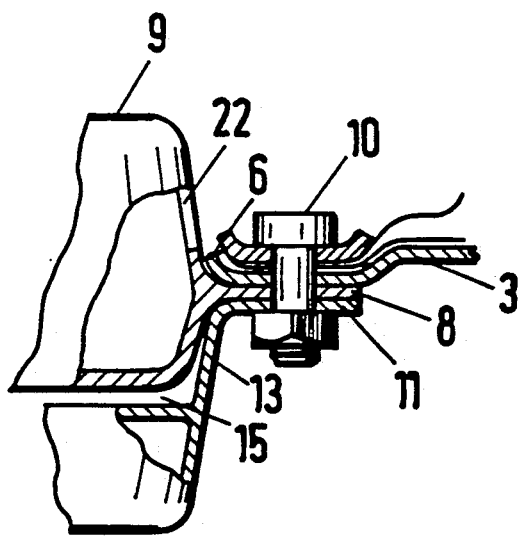
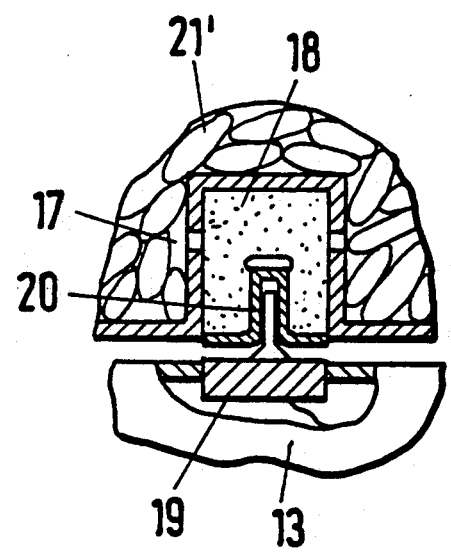

STEERING WHEEL MOUNTED AIR BAG MODULE INCLUDING ELECTROMAGNETICALLY SHIELDED SENSOR

FIELD OF THE INVENTION

The invention is concerned with a safety device for motor vehicles in the form of an impact protection arrangement including a so-called "air bag".

BACKGROUND OF THE INVENTION

Such devices have become known in diverse forms of implementation. They are commonly designated by the name of "air bag" and comprise a gas pillow arrangement, whereby a folded bag, mounted on the steering wheel of the vehicle, is suddenly inflated when the ignition of a gas generator is activated by a sensor. Depending on the type of construction this sensor is mounted either on the housing of the gas generator, or within the gas generator, or within the gas pillow arrangement. So far, mostly mechanical or electromechanical sensors have been used.

Through the DE-OS 3,619,937 a safety air bag is known which is integrated with a solid fuel gas generator for forming a preassembled structural unit which includes the sensors and an energy storage device.

These module type units are advantageous in mounting and removal, especially also for retrofitting. They have, however, a series of serious drawbacks. Thus, the gas generator housing requires a special configuration because of the integration and protection of the enclosed or directly connected sensor, which must not be exposed to the generated gas pressure. This leads necessarily to strengthened dimensions for the housing and hence to an increased weight. Furthermore, it has been shown that the reliability is less than optimal because the interface problems permit testing only after final assembly in the vehicle. An additional drawback is that failures in the system always require the exchange of the entire unit.

OBJECTS OF THE INVENTION

The object of the present invention is to create a safety device of the above described type which not only removes the prior art drawbacks mentioned above, but also provides an easily attachable unit made up of the main elements with simple connections of the ignition and with an effective electrical screening against interference.

SUMMARY OF THE INVENTION

According to the invention there is provided: a safety device for motor vehicles in the form of an impact protection arrangement, comprising a gas bag device fastened to the steering wheel of the vehicle, and combined with a gas generator and associated electronic ignition device into a structural unit, characterized in that the sensor for the activation of the ignition device is attachable to the housing of the gas generator by the sensor housing flange, whereby the latter is held and fixed in position on the steering wheel of the motor vehicle by the support element with the mounting flange of the gas generator housing and by attachment elements in such a way, that the sensor housing and the gas generator housing form a complete electromagnetic shielding of the sensor and the ignition device.;

BRIEF DESCRIPTION OF THE DRAWINGS

In order that the invention may be clearly understood, it will now be described, by way of example, with reference to the accompanying drawings, wherein:

FIG. 2 shows a schematic drawing of the coordination of the sensor and gas generator housings in an example embodiment;

FIG. 3 shows a partial section of the connection of the gas generator housing, the sensor housing, and the support element to the steering wheel; and FIG. 4 shows a partial section of the ignition and its sensor contacts in an example embodiment.

Figure 1:
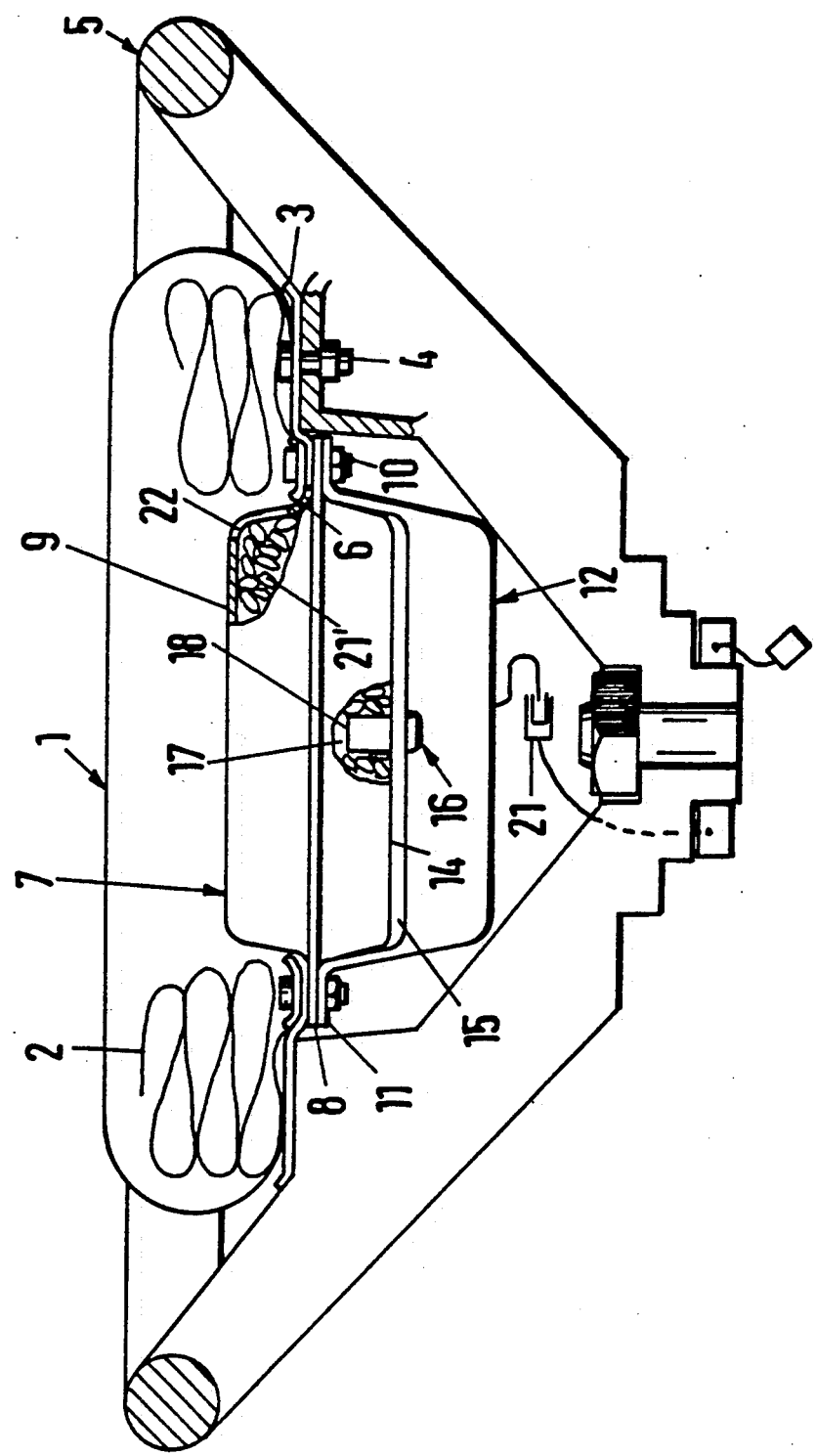
FIG. 1 shows a schematic drawing of the complete safety device when mounted on the steering wheel.

DETAILED DESCRIPTION OF PREFERRED EXAMPLE EMBODIMENTS AND OF THE BEST MODE OF THE INVENTION

The example embodiment shown in FIG. 1 comprises a conventional folded gas pillow 2 or air bag under a cover 1, a gas generator 7, and a sensor 12 for the "ignition" or activation of the gas generator. The gas pillow or air bag 2 is mounted on the main part of the steering wheel 5 of the vehicle by a support 3 — for example a sheet metal ring or bars — and screws 4. The sheet metal support is shaped so that it has a circular opening with a pressed edge reinforcement 6 for the attachment of a pyrotechnical gas generator 7 by a circumferential mounting flange 8 of the gas generator housing 9 and screws 10. Also mounted to the reinforced edge 6 is the electronic sensor 12 by an attachment flange 11 and the attachment elements such as screws and nuts 10.

The sensor 12 — preferably an electronic sensor — for the activation of an electronic ignition device 18, is thus attachable to the housing 9 of the gas generator 7 by the sensor housing flange 11. The latter is then fastened with flange 8 of the gas generator housing by attachment elements such as screws and nuts 10 to the support element 3 and thereby held and fixed in position on the steering wheel 5 of the vehicle. Flanges 8 and 11 are of the same construction considering their external diameter 23 (FIG. 2), the identical bores for the attachment screws 10, and the edge reinforcement 6. The gas generator flange 8 and the sensor housing flange 11 are integral elements of housings 9 and 13, respectively, and have the same shape, and are held in an exact fixed position relative to each other by the screws 10.

The flange 11 is integrated with the sensor housing 13 thereby forming a housing extension having a pot shape which takes up the respectively shaped bottom part 14 of the gas generator 7 in such a way that an electromagnetically shielded air gap 15 is formed between the sensor 12 and the electronic ignition 18. Within the shielded air gap 15 is a two part electrical contact device 16, which connects the sensor 12 and the electronic ignition device 18 arranged within the combustion chamber 17 of the gas generator 7.

As shown in FIG. 4, the contact device 16 is formed as a two part plug-in contact wherein one contact part 19 is housed in the sensor 12 or its housing 13, while the other contact part 20 is in the electronic ignition 18. In addition, both contact parts 19 and 20 are arranged so that they automatically plug into each other when the electronic sensor and the gas generator 7 are assembled. The power necessary for the ignition is provided by the electrical system of the vehicle — the vehicle on-board power supply — through the plug-in connection 21 of the electronic sensor 12, or respectively, by a battery power source. The arrangement of the electronic ignition 18 and the contact device 16 within the electromagnetically screened air gap 15, protects the ignition function from all outside interference.

When the predetermined conditions for the triggering of the sensor 12 are present, the ignition electronic ignition device 18 is activated. Thereby the pyrotechnical, gas producing material 21 of the gas generator 7 is ignited. Gas under high pressure flows explosion-like through holes 22 in the housing 9 of the gas generator 7, respectively its combustion chamber 17 and filter element, and inflates the gas pillow or air bag 2. The sensor 12 and its corresponding contact device 16 can comprise any type of sensor, electronic, mechanical, or hybrid.

The proposed measures create a structural system unit which is easily exchangeable, depending on need, either as a whole unit or in its parts (sensor, ignition, generator, air bag). Each element is easily testable without any problems, and the simple connector for the ignition assures the connection or disconnection without any problems. Of particular advantage is the minimization of interfering influences on the electronic sensor and ignition.

Although the invention has been described with reference to specific example embodiments, it will be appreciated that it is intended to cover all modifications and equivalents within the scope of the appended claims.

We claim:

1. A safety device for motor vehicles for protecting a person against impact injuries, comprising air bag means fastened to a steering wheel of the vehicle for protecting a person, gas generator means including a gas generator housing with a first mounting flange for generating an inflating gas for said air bag means, electronic ignition means for starting a gas generation in response to an impact, sensor means for activating said electronic ignition means, a sensor housing having a second mounting flange attached to said first mounting flange of said gas generator housing, support means and attachment elements for securing said first and second mounting flanges in a position on the steering wheel in such a way that said sensor housing and said gas generator housing form a complete electromagnetic shielding for said sensor means and said electronic ignition means, and wherein said first mounting flange and said second mounting flange are integral flanges of the respective gas generator housing and sensor housing, said first and second mounting flanges having a matching form so that their exact position relative to each other is fixed by said attachment elements.

2. The safety device of claim 1, wherein said sensor housing with its integral mounting flange is dimensioned for containing said gas generator housing and for forming an electromagnetically shielded air gap between said sensor means and said electronic ignition means.

3. The safety device of claim 2, further comprising electronic contact means arranged between said sensor means and said electronic ignition means within said air gap.

4. The safety device of claim 1, wherein said sensor means comprise electrical plug-in contact means for connection to an on-board power supply.

5. The safety device of claim 1, wherein mounting holes of said sensor housing, of said gas generator housing, of said support means, and of said gas pillow means are in register with each other.

* * * * *